United States Patent [19]
Krieg

[11] 3,788,192
[45] Jan. 29, 1974

[54] METAL FORMING TOOL
[76] Inventor: Adrian H. Krieg, 2627 Dunning Dr., Yorktown, N.Y. 10598
[22] Filed: Nov. 1, 1971
[21] Appl. No.: 194,284

[52] U.S. Cl............................ 90/40, 90/31, 90/44, 83/3
[51] Int. Cl.............................................. B23d 3/04
[58] Field of Search......... 90/38, 31, 24, 39, 40, 43, 90/44; 83/3

[56] References Cited
UNITED STATES PATENTS

| 3,192,835 | 7/1965 | Leibinger | 90/24 R |
| 2,727,438 | 12/1955 | Gack | 90/31 X |
| 3,451,310 | 6/1969 | McCullough | 90/31 X |
| 616,002 | 12/1898 | Marles | 90/31 X |

Primary Examiner—Gil Weidenfeld
Attorney, Agent, or Firm—Murray Schaffer

[57] ABSTRACT

A tool for preparing beveled edges on metal workpieces having workpiece holding means and a cutting element. The cutting element being mounted in a carrier pivotally movable in an arc to form a curved bevel in the workpiece.

15 Claims, 9 Drawing Figures

PATENTED JAN 29 1974
3,788,192
SHEET 1 OF 2
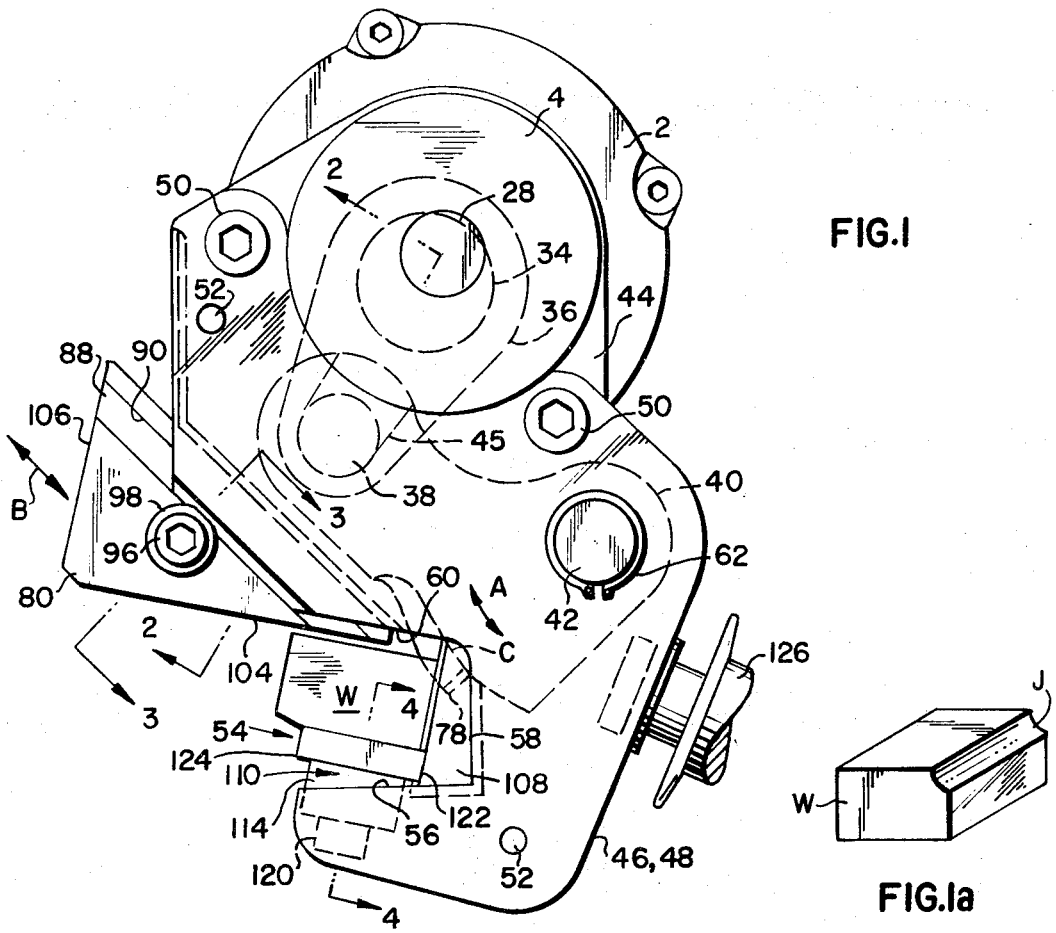
FIG.1
FIG.1a
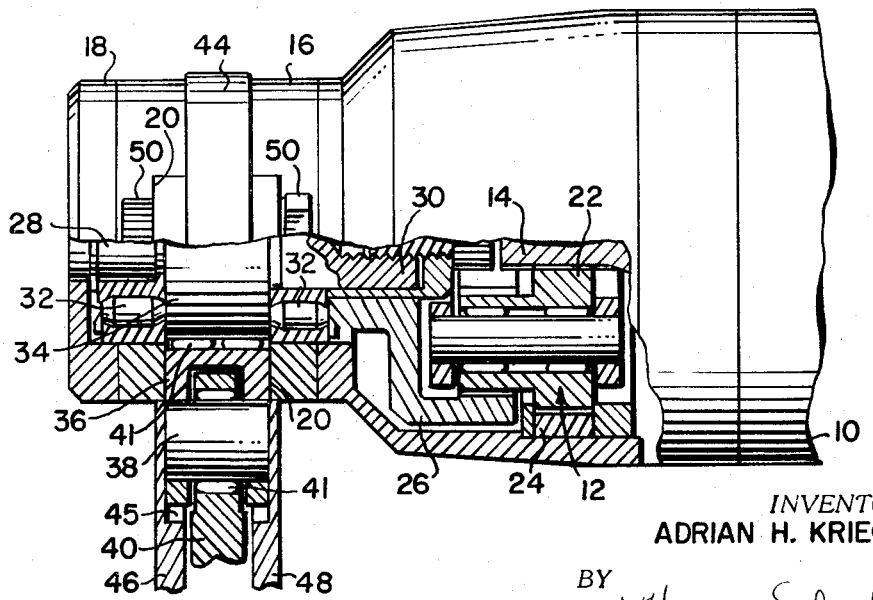
FIG.2
INVENTOR.
ADRIAN H. KRIEG
BY  *Henry Schaff*
ATTORNEY

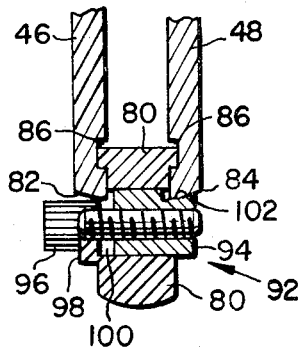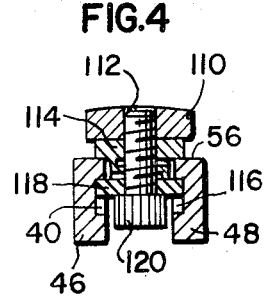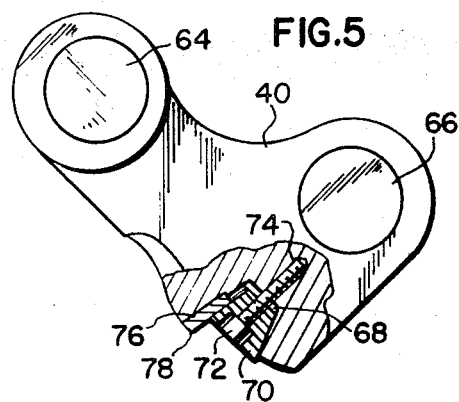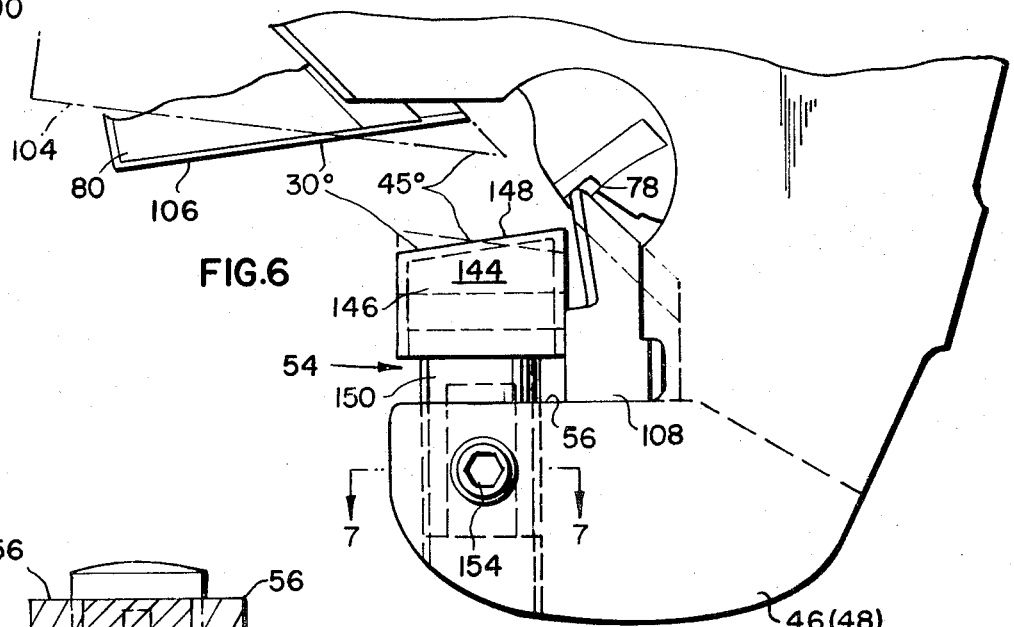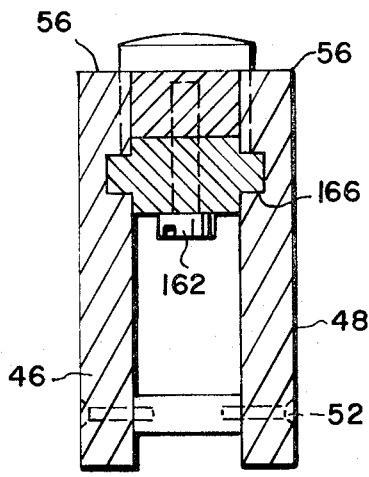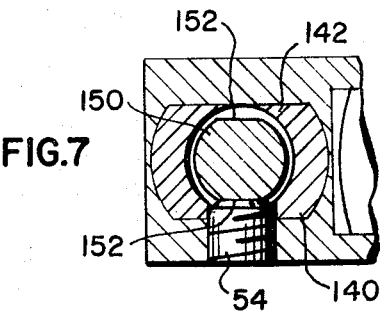

3,788,192

METAL FORMING TOOL

BACKGROUND OF THE INVENTION

The present invention relates to metal forming tools and in particular to a portable tool for preparing the edges of metal work-pieces prior to their being welded together.

The edge of the metal pieces which are to be joined by welding are provided with a bevel which insures the proper abutment of the pieces and enables the weld to obtain a sufficiently good penetration to insure proper adhesion. Depending upon the welding procedure which is employed, the joined shapes between the metal workpieces are bevelled in different forms, that is, predetermined amounts of material are removed from the edges of the metal workpiece to form dovetail or other interengaging edges which insure that the weld material flows properly and joins the parts. The present invention concerns a tool for making a J-bevel.

Portable electrical forming tools carrying out a bevelling function are known. The conventional tools consists of an electric motor, a gear case and a guide bracket which is propelled over the material to be bevelled. A cutting element is reciprocated along a straight line by the electric motor which cuts the material by punching or tearing at the workpiece as the cutter is being reciprocated. The conventional device is also provided with means for guiding the workpiece, a rest plate on which the work is held and which also provides a workstop to absorb the forces of the reciprocating cutting element and a moveable strip to provide the proper gap opening made by the cutting element. Depending upon the measurements of the workpiece and the desired bevel, single ones of these auxiliary means are exchangeable so that specifically designed machine parts may be used to obtain the proper bevel. In order to accomodate workpieces of different sizes the rest pieces or work-stop portion was sometimes mounted on a pivotable arm or bracket.

The conventional tool has serious drawbacks arising from the straight line reciprocation of the cutting element. First the entire force produced by the load on the cutting element must be absorbed by the tool resulting in considerable energy loss. Considerable friction and wear is developed between the cutting element and its guidance structure. Slag, dirt, rust, etc. is introduced into the tools, significantly reducing the life of the machine.

Furthermore, the cutting edge of the cutter element must be frequently sharpened or replaced. In order to do this, the entire guide bracket must be removed and the element extracted from its holder. On replacement of the element, it must be readjusted due to the fact that a sharpened element is shorter or a new element is longer.

Most important, however, is the fact that the prior art devices can not form a J-bevel where a portion of the edge is curved or concave, because the reciprocating straight line action of the cutting element permits only straight cuts as in the conventional V, X, or K shapes.

It is an object of the present invention to provide a portable beveling tool overcoming the defect of the prior art.

It is a particular object of the present invention to provide a bevelling tool capable of making a J-bevel without the need for subsequent machining.

It is another object of the present invention to provide a bevelling tool having a longer life and requiring less repair and resharpening.

It is still another object of the present invention to provide a bevelling tool which is easier to use, simpler in construction and more economical.

These objects, as well as others together with numerous advantages will be apparent from the following description.

SUMMARY OF THE INVENTION

According to the present invention a tool for bevelling an edge of an elongated metal workpiece is provided comprising a head, a stirrup, depending from the head and a cutting member. The stirrup defines an opening for receiving the workpiece and means are provided for interconnecting the cutting element with a motor to swing the cutting element in an arcuate path through a corner of the opening to cut a curved groove or bevel in the workpiece.

Preferably, the cutting member is pivoted to the stirrup so as to be fulcrumed about a point remote from the connection thus providing the arcuate path. The cutting member includes a replacable blade element, which may also be formed with more than one cutting edge. The blade edges can be sequentially presented for use prior to the replacement of the entire blade.

Also, the present invention provides a bed plate for supporting the workpiece which is adjustable both vertically and horizontally within the opening whereby the workpiece may be held for action by the cutting member at a predefined and fixed position.

A guide is also provided for limiting the upper edge of the opening and for positioning the workpiece. This guide is adjustable so that it may present its edge at one or more angles to the workpiece. It may also be replacable.

Full details of the present invention will be seen in the attached drawings and from the following description.

BRIEF DESCRIPTION OF THE DRAWINGS

In the accompanying drawings:

FIG. 1 is an end view of a bevelling machine embodying the present invention,

FIG. 1a is a view of a workpiece bevelled according to the present invention,

FIG. 2 is a side view partially in section of the machine shown in FIG. 1,

FIG. 3 is a sectional view taken along lines 3—3 of FIG. 1,

FIG. 4 is a sectional view along lines 4—4 of FIG. 1,

FIG. 5 is a view of the cutting element carrier seen in dotted lines in FIG. 1,

FIG. 6 is an enlarged view of FIG. 1 showing modified bed plate portion,

FIG. 7 is in section along lines 7—7 of FIG. 6, and

FIG. 8 is an enlarged view of an adjustable mounting for the bed plate.

DESCRIPTION OF THE INVENTION

Turning now to FIGS. 1 and 2 the present invention is embodied in a tool capable of being manually carried and manipulated by a single operator. The tool comprises a housing 10 in which a planetary gear system 12 is located and driven by a pinion 14 of (not shown) conventional rotary motor located in the remaining portion of the housing. The motive means is preferably an electric motor including control systems, both of which are conventional in hand tools and portable machine tools. Extending axially from the opposite end of the housing 10 is a cylindrical cowling 16 capped at its end by a cover member 18. The cowling has an arcuate opening 20 along a portion of its lower periphery.

The motor pinion 14 meshes with the exterior planetary gear 22, of the planetary system 12 which includes a fixed gear 24 and a rotating inner gear 26. A shaft 28 is keyed at 30 or otherwise integrally fixed to the gear 26 and extends coaxially within the cowling 16. The shaft 28 is journaled within a pair of spaced bearings 32 supported by the cowling. The adaption of a planetary gear system with a rotary motor provides a high torque and power input in a minimum of space. Further, such a system may be easily controlled as to speed. However, a rotary drive, power and transmission system is not essential and may be replaced with other suitable motive means.

Fixed eccentrically of its center to the shaft 28 is a circular sleeve 34 to the outer perimeter of which a connecting arm 36 is fixed. The arm 36 extends generally downwardly out of the cowling opening 20 and has fixed to its outer end a pivot pin 38 about which a cutting element carrier 40 is pivotably fulcrumed. Roller bearings 45 are interposed about the shaft 28 and the pivot pin 38. The cutting element 40 is eccentric in shape, as seen later and is pivotally movable about a second fulcrum pin 42 offset from the pin 38.

Surrounding the cowling 16 is an integral yoke 44 to which a pair of generally C shaped or stirrup shaped plates 46 and 48 are secured by bolts 50. The stirrup plates 46 and 48 are spaced from each other by a distance equal at least to the width of the opening 20 through which the arm 36 passes thus, permitting the cutter element carrier 40 to freely move therebetween. The C shaped stirrup plates 46 and 48 are joined about their peripheries by one or more bolts 52 provided with appropriate interior spacers. The stirrup plates are arranged so that its bight or opening, generally defined by the numeral 54, lies beneath the carrier 40. The bight 54 is defined by a horizontal lower edge 56, a vertical back edge 58 and a horizontal upper edge 60, formed in each of the plates 46 and 48. The second fulcrum pin 42 for the cutting element carrier 40 is located at the upper portion of the stirrup plates 46 and 48 and is removably retained transversely thereto in bearing seats by a C-clamp 62 or similar removable fastening means.

As seen in FIG. 5, the carrier 40 is a generally triangular eccentric member provided with a hub 64 at one of its base angles which is adapted to pivot about the first pivot pin 38, and a second hub 66 at the other of its base angles adapted to pivot about the second pivot pin 42. At its apex, however, the carrier 40 is cut with a transverse groove 68 in which a wedge 70 is fit. A screw 72 extends through the wedge 70 and is secured with a threaded bore 74 in the carrier. This arrangement is adapted to hold a cutting element 76 in the forming of a plate of hardened steel or carbide whose leading edge 78 produces the bevel cut. This arrangement is simple and easily manipulated without disassembly of the machine to adjust the position of edge 76 with regard to a workpiece located within the bight 54. The cutting element 78 is also provided with a sharp edge about each of its peripheral sides, so that when one edge is worn it may be simply rotated to provide a new sharp edge for use before the entire blade is discarded and replaced.

As seen in FIG. 1 the carrier 40 is pivoted to swing about the fixed pivot axis 42 on reciprocation of the arm 36 and at the same time about the pivot pin 38. This enables the carrier 40 to take an arcuate path of movement within a plane parallel to the plane of the stirrup described, generally and schematically, by the arrow A. By dimensioning the carrier 40, and the spacing of the pivot pins 38 and 42 appropriately, the cutter element 78 may be made to pass through a corner C of the bight 54 in such an arcuate path, that a workpiece W, placed transversely within the bight 54, will be engaged and will be honed or cut with a corresponding curved bevel, such as the desired J-bevel, as seen in FIG. 1a.

A guide member in the form of a triangular plate 80 is located between the leading edges 82, 84, (FIG. 3) of the stirrup plates 46, 48. The leading edges 82, 84 of the stirrup plates are straight edges angled downwardly toward the bight 54. The edges are bevelled with a flat flare outwardly along their entire surface as seen in FIG. 3. Grooves 86 are formed on the inner surface of the plates 46, 48 parallel to the straight edges 82 and 84 respectively. The triangular guide 80 is also provided with a groove or slot 88 having a straight lip 90 which fits correspondingly in the grooves 86 so that the triangular guide 80 may be made to slide with respect to the stirrup plates 46, 48 toward and away from the bight 54 along the path indicated by the arrow B. The triangular guide 80 is held firmly in a desired position by a manipulatable securing mechanism 92 mounted on the guide as seen in FIG. 3, comprising a wedge 94 transversely adjusted by a thumb screw 96 the head of which is spaced from the flat surface of the guide 80 by a washer 98. The mechanism 92 is generally situated through a hole 180 bored transversely through the guide 80 a distance from the groove 88 so that the wedge 94 engages the outwardly bevelled edge of one of the stirrup plates 46, 48. The wedge 94 may be conical or cubed and should, as seen in FIG. 1, have an edge 102, preferably flat, which engages the edge 82 or 84.

The triangular configuration of the guide 80 and the arrangement of groovings in both it and the stirrup plates permit the guide to be reversed, so that either of its edges 104 or 106 (FIG. 1) may be made to face the workpiece. Thus, the same guide 80 may be used with varying workpieces, eliminating the need for the user to stock numerous pieces of auxiliary equipment. As seen in the drawings, the guide 80 and the cutting element carrier 40, because of their arrangement between the plates 46, 48, are aligned in the same vertical plane. This arrangement and the dimensions of the device are such, however, that notwithstanding the depth at which the guide 80 is slid along the path of the arrow B, the carrier 40 is swung about its arcuate path A so that the cutting element 78 always clears the edge of the guide and contacts only the edge of the workpiece located in the bight 54.

A depth stop or die 108 may be provided at one side of the stirrups 46, 48 to limit the extent of the bight 54 and thus enable the positioning of the workpiece W in it. The stop 108 may be adjustably screwed or otherwise fastened to one or both of the plates 46, 48, preferably outside of them, so as not to interfere with the movement of the carrier 40 and the cutting element 78.

The workpiece is adapted to rest on a bed plate 110 secured along the lower edges 56 of the stirrup plates along the bight 54. One form of bed plate mounting arrangement is seen in FIG. 1 and FIG. 4. The bed plate 110 is provided with a centrally threaded bore 112 and is backed by a T-shaped element 114, the stem of which fits between plates 46 and 48. The plates 46 and 48 are provided with grooves 116 running parallel to the edges 56 in which a washer 118 may be located. A thumb screw 120 extends through the washer 118 and the T-shaped element 114 into the threaded bore 112 of the bed plate 110. Tightening of the thumb screw causes the bed plate to be drawn securely into a seated arrangement against the edges 56 of the plates 46, 48. The bed plate 110 is adjustable toward and away from the depth stop 108 by sliding it in the groove 116, although preferably it is positioned in use with its forward edge 122 abutting against the depth stop (FIG. 1). This edge 122 is itself provided with a J-bevel in order to accommodate any slag or irregularities in the workpiece W. The opposite or rear edge 124 of the bed plate may be square. By reversal of the bed plate 180°, the square edge 124 may be used against the depth stop 108 to provide a square rest for the workpiece. Soft and hard materials may thus be used. By suitably sloping the edges 56, or the stem 114 of the bed plate as seen in FIG. 1, the adjustment of the bed plate with respect to the depth stop 108 also causes the bed plate 110 to rise or fall with respect to the upper edges 60 of the bight 54, as the bed plate itself is shifted into or out of the bight by sliding it in the grooves 116. This permits a limited degree of vertical adjustment of the workpiece with respect to the cutting element carrier 40.

A handle 126 may be secured to the stirrup plates 46, 48 in conventional manner, or by a similar slot and wedge arrangement as secures the guide plate 80 or the bed plate 110 may be used to secure the handle.

The stirrup plates 46 and 48 may be reversed with respect to the motor housing so that the bight 54 will open to the right instead of the left, as shown in FIG. 1. This is accomplished simply by removing bolts 50 and shifting the plates 46, 48 downwardly through a slot 45 so that the pivot pin 38 can be removed. The entire assembly may then be reversed and the pivot pin 38 replaced and the bolts 50 retightened.

In operation, the machine is carried to the elongated workpiece and is placed over it so that the workpiece rests on the bed plate 110. The guide plate 80 is lowered to enable movement of the machine along the face of the workpiece but prevents skewing or canting of the machine during its cutting operation. The position of the depth stop 108 is adjusted to control the depth of the bevel to be cut and the machine is then actuated. The arcuate reciprocation of the carrier 40 causes the cutting element to hit the edge of the workpiece and gouge the bevel in its edge. As the machine is moved along the length of the workpiece W a continuous bevelled edge is obtained, as seen in FIG. 1a.

The motion of the cutting tool does not follow a straight line and its arcuate movement produces a concave bevel of the J-type. This has an added advantage in that the movement of the cutting element in the circular path does not tear or hammer at the material of the workpiece but shears and cuts the material. Thus, the workpiece is provided with the proper concavely curved or arched bevel required by the welding codes. Another advantage is obtained in that the present invention the lateral forces of cutting are more efficiently absorbed and friction is markedly reduced. The machine will have a considerably longer life.

The edges of the cutting element do not require the frequent sharpening required by the prior art devices. However, since the blade or cutting element 78 is rotatable, a new edge may be provided in a matter of seconds. Since the edges of the blade are symmetrical with respect to the element as a whole, it is not necessary to constantly readjust the machine when a new edge is presented as is necessary in prior art devices where blades are fully replaced. The cutting element 78 may be made of such size, that when all four of its edges have been used the element has been exhausted and may be thrown away. This reduces costs for resharpening and resetting. Thus, neither carrier 40, bed plate 110 or depth stop 108 need be readjusted once cutting has begun even though the cutting edge is rotated. Still another advantage occurs from the present arrange in that the cutting element may be made of carbide or similar materials having long life. Because the element cuts, rather then impacts the material, such material may be used even though they normally have low resistance to impact shock.

The guide plate 80 may be adjusted to present different degrees of attack on the workpiece and may be reversed as previously described into different positions. Similarly, the bed plate 110 can also be adjusted to provide varying rest surfaces and different levels of support.

In the above mentioned embodiments a generally fixed, although partially adjustably fixed bed plate, is shown. It may however, be sometimes advantageous to provide bed plates which are not only adjustable with respect to the depth stop but are also vertically adjustable. In FIGS. 6 and 7 one such bed plate construction is shown. As seen in these Figures, the lower edges 56 of the stirrup plates 46, 48 within the bight 54 may be left flat and in a horizontal plane. Set securely between the plates 46, 48 below the bight is an oval bushing 140 having a circular bore 142. Slidably mounted in the bore 142 is a base plate generally depicted by the numeral 144 comprising a head 146 having an upper flat surface 148 inclined with respect to the horizontal and a stem 150. The stem 150 is generally circular and fits within the bore 142, however, it is provided with a pair of opposed flat surfaces 152 running substantially its length. Extending transversely through the face of one stirrup plate 46 or 48 and the bushing 140 is a set screw member 154 which is adapted to abut in pressure relationship against the flat land surface 152 of the stem 150. It will be observed that a small turn loosening the set screw 154 will permit the base plate to be raised vertical toward the cutting element 78 while a greater degree of loosening will permit the base plate to be swivelled in the bushing, so that the higher or lower edge of the flat face 148 may be presented toward the cutting element. By the latter adjustment the angle of the face 148 with the slidable guide 80 may be varied. By this arrangement both the height of the bevel and the angle of attack of the cutting element with respect to the workpiece may be varied. FIG. 6 shows the advantage obtained by having a reversible guide 80, in the manner earlier described. The positions of leading edges 104 and 106 are seen in dotted and full lines respectively. With this only one depth stop or die member 108 is necessary. As seen by providing edge 106 with a backwardly sloping bed plate an angle of attack of 30° may be obtained while reversing the two an angle of 45° may be obtained relative to the horizontal. Thus, more then one degree of bevel can be obtained with the same machine.

Still another form of adjustable bed plate is seen in FIG. 8. The bed plate 160 is similar to that seen in FIG. 4, however, the plate and T-shaped stem are integral with each other and the screw 162 is threadably secured to the stem and extends through the retaining washer 164 which fits within a groove 166 with no vertical play so that it acts as a back stop and retaining member. Thus, rotation of the screw will adjust the height of the bed plate while maintaining it fixedly secured to the stirrup plates 46, 48. Numerous other adjustable mountings are obtainable.

It will thus be observed that the objects aforementioned are all obtained by the present invention and that a simple efficient bevelling machine is obtained to overcome the defects of the prior art. Various changes and modifications are permissable and will be obvious to those skilled in this art. It is therefore, intended that the present description be illustrative only and not limiting of the present invention.

I claim:

1. A tool for bevelling an edge of an elongated workpiece comprising a head, a stirrup depending from said head, an opening defined in said stirrup for receiving said workpiece transverse to the plane thereof, a cutting member secured to a carrier, and motive means for moving said carrier, said carrier being pivotally secured about a first fulcrum to said stirrup and about a second fulcrum to said motive means to be carried to move within a plane parallel to that of said stirrup in an arc having said cutting element intersecting a corner of said opening to cut the edge of said workpiece with a curved face.

2. The tool according to claim 1 wherein said stirrup comprises a pair of spaced plates secured to said head and said means for interconnecting said motive means and said cutting member comprises an arm connected to said motive means and depending between said plates, said carrier being pivotally journalled about a pin fixed to said plates and a pin fixed to said depending arm to be fulcrumed for arcuate movement about an axis remote from both said pins.

3. The tool according to claim 2 wherein said cutting member includes a blade, and fastening means for removably securing said blade to said body whereby the same may be removed and replaced.

4. The tool according to claim 3, said cutting tool comprises a blade having a plurality of cutting edges and said means for securing said blade is adapted to locate the blade with any one of said edges exposed.

5. The tool according to claim 2, said cutting member comprises a generally triangular body journaled adjacent the respective base angles thereof to said plates, said cutting blade being mounted on said body adjacent the third angle thereof.

6. The tool according to claim 2 wherein said motive means comprises a motor having a rotating drive shaft, an eccentric sleeve mounted on said drive shaft, said depending arm being journaled on said eccentric sleeve to move in a non-linear manner effecting the arcuate movement of the cutting member.

7. The tool according to claim 2 including bed plate means for supporting said workpiece and means for removably mounting said bed plate in the opening of said stirrup.

8. The tool according to claim 7 including means for movably mounting said bed plate within said opening to selectively adjust the position of said workpiece within said opening.

9. The tool according to claim 2 including guide means slidably mounted on said stirrup above said opening and movable into and out of the opening for said workpiece to limit the upper extent of said opening and to position said workpiece therein.

10. The tool according to claim 9 wherein said guide means comprises a triangular plate slidably mounted along one edge between the plates of said stirrup, the remaining edges of said guide extending at different angles with respect to said one edge, said guide being adapted to selectively present one of the remaining edges toward said opening thereby varying the angle of the edge limiting the upper extent of said opening.

11. The tool according to claim 9, wherein said guide means and said cutting member are aligned in the same plane between the plates of said stirrup and cooperate to stabilize the workpiece during cutting.

12. The tool according to claim 2 wherein said plates are removably secured to said head, and said arm carrying said cutting member is removably secured to said cutting member, the means for securing said plates and head being removable and symmetrically arranged whereby the plates may be jointly reversed, reversing the position of said opening with respect to said head, and said arm reconnected to said cutting member.

13. The tool according to claim 8 wherein said bed plate comprises a body, a stem supporting said body, stem flange means supported by said stem, a groove formed parallel to the lower edge of the opening in each of said plates for receiving said flange means and screw means for connecting said body and stem in pressure engagement about the edge of said plates, said pressure engagement being releasable to permit sliding movement of said bed plate relative to the edge of said opening.

14. The tool according to claim 13 including second flange means supported by said stem and adapted to rest upon the edge of the opening, said screw means being adapted to raise said bed plate while maintaining said flanges in pressure engagement about the edge of the opening.

15. The tool according to claim 8 wherein the bed plate comprises a body and a stem having a pair of parallel opposed flat sides extending the length thereof integral with said body and includes a bushing secured between the plates of said stirrup, said bushing having a circular bore formed therein, and a screw extending radially therein, into selective engagement with the flat sides of said stem.

* * * * *